No. 721,252. PATENTED FEB. 24, 1903.
C. L. TAYLOR.
LUBRICATING BOX FOR AXLES OF OVERHEAD TRAVELING CRANES.
APPLICATION FILED NOV. 1, 1902.
NO MODEL. 3 SHEETS—SHEET 2.
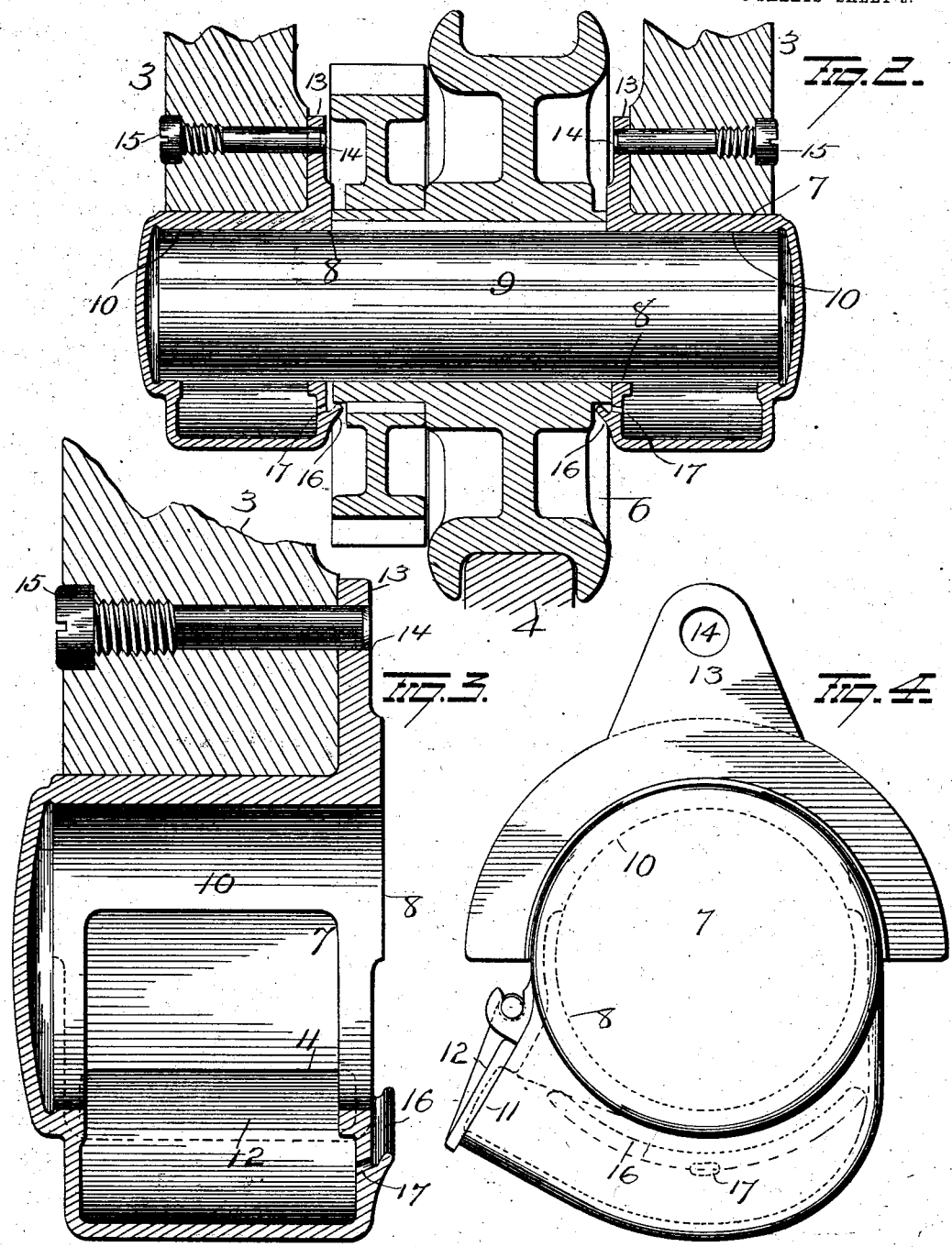

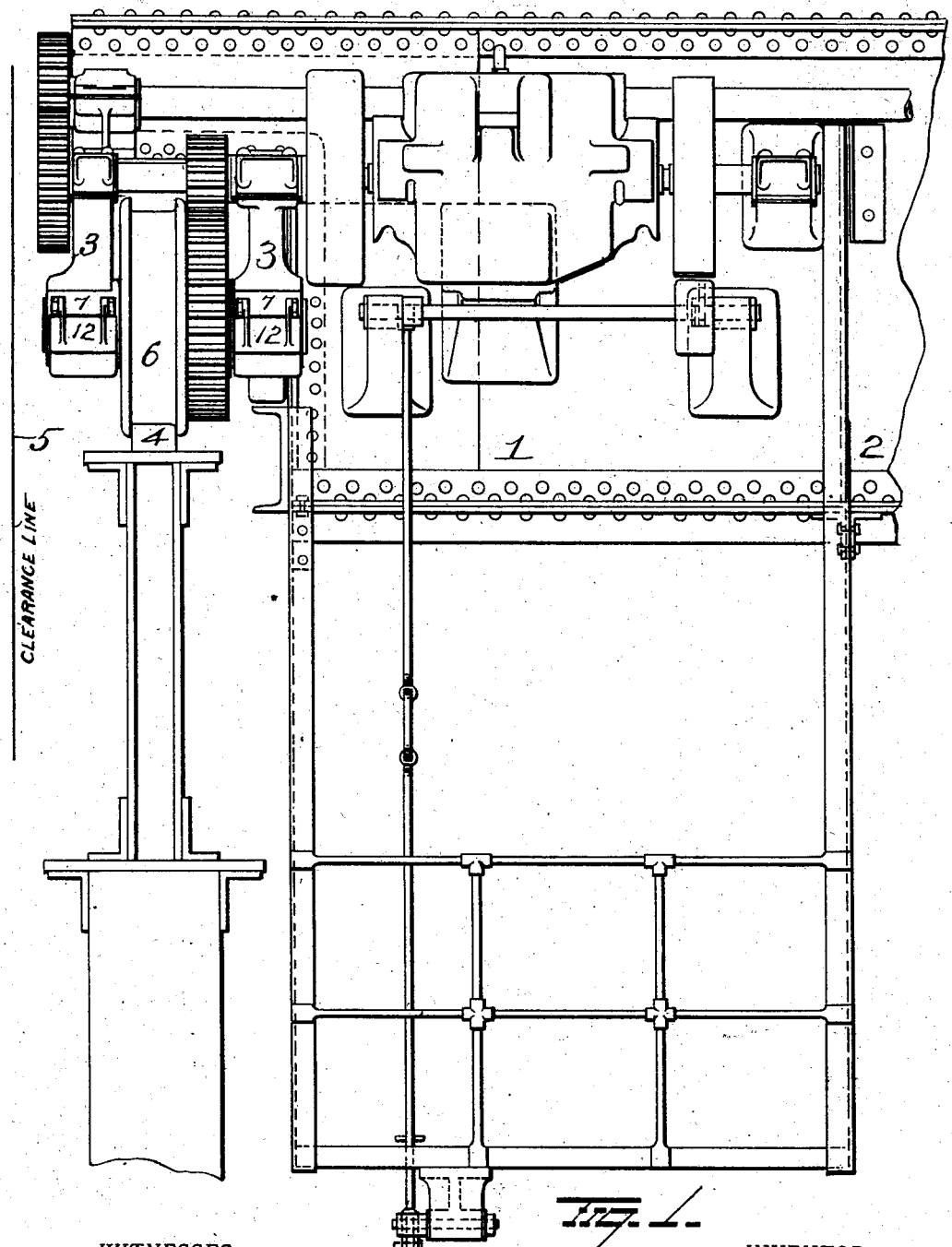

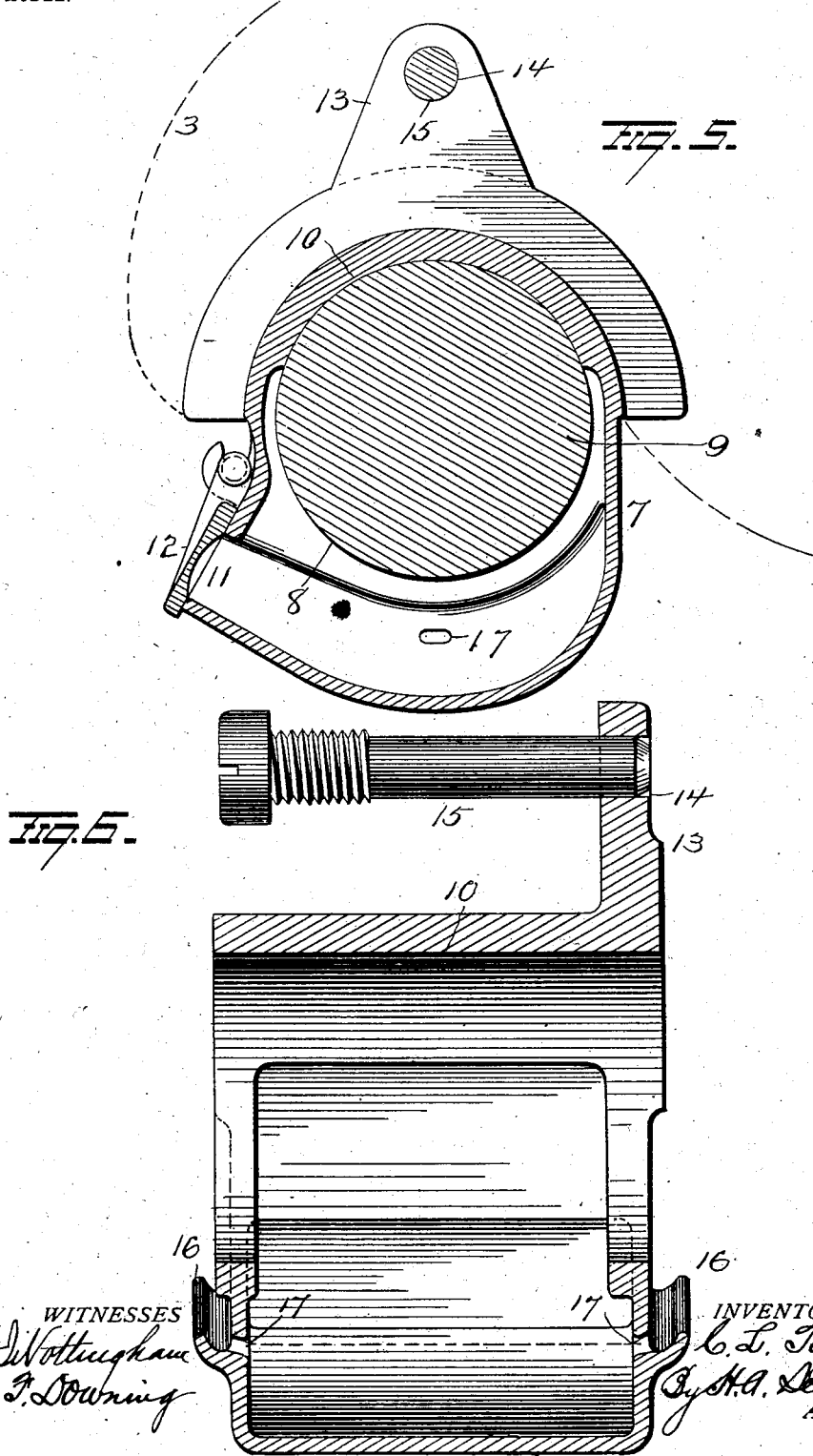

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

LUBRICATING-BOX FOR AXLES OF OVERHEAD TRAVELING CRANES.

SPECIFICATION forming part of Letters Patent No. 721,252, dated February 24, 1903.

Application filed November 1, 1902. Serial No. 129,749. (No model.)

*To all whom it may concern:*

Be it known that I, CLARENCE L. TAYLOR, of Alliance, in the county of Stark and State of Ohio, have invented certain new and useful Improvements in Lubricating-Boxes for the Axles of Overhead Traveling Cranes; and I do hereby declare the following to be a full, clear, and exact description of the invention, such as will enable others skilled in the art to which it appertains to make and use the same.

My invention relates to an improvement in lubricating-boxes for the axles of overhead traveling cranes, and is designed particularly as an improvement on the construction patented to me May 16, 1899, No. 624,994. In the construction disclosed in said patent the oil box or receptacle is provided with a half-bearing to receive the lower half of the axle and is secured by bolts passing up through a flange on the box and into the bridge or trolley frame, removable brasses being employed for supporting the ends of the axle. In the present structure the oil-box is made to embrace the axle, the top section of the box forming the bearings for the ends of the axles, the boxes being held in place each by a single bolt passing through the frame of the bridge or trolley and into an opening formed in an upwardly-projecting flange on the box.

In the accompanying drawings, Figure 1 is a view of one end of a traveling crane, showing my improved oil-boxes thereon. Fig. 2 is a view in section of one end carriage of Fig. 1. Fig. 3 is an enlarged view in section through one of the boxes and a section of the frame of the apparatus. Fig. 4 is an end view of the latter. Fig. 5 is a view in transverse section through the axle and lengthwise the box, and Fig. 6 is a view similar to Fig. 3 of a modification.

1 represents a section of a traveling bridge. This bridge comprises longitudinal girders 2 and end carriages 3, mounted on wheels, which latter travel on runways 4, only one of which, however, is shown.

In a large majority of instances the runways 4 are located well up to the walls 5 of the building, so as to enable the trolley to cover the entire floor-space. The wheels 6 of the end carriages 3 travel on the rails of the runway 4, and as each wheel is secured on an independent axle supported by bearings on the opposite sides of the wheel it follows that there is not sufficient room between the outer ends of the axles and the walls 5 for oil-boxes or for outwardly-opening lids of oil-boxes. Hence heretofore these axles were prior to my patented invention referred to lubricated by the introduction of small quantities of oil fed at comparatively short intervals through holes in the top of the bearings, the holes leading down to the axles.

My present invention is designed to furnish self-oiling bearings, and it comprises boxes 7, removably secured in suitable recesses in the under side of the end carriages or frames, each box carrying a supply of oil which is fed to the axle by cotton-waste or any approved means. The end carriages 3 are supported on these axles, as before explained, and the boxes 7, one for each end of the axle, are each provided on its inner side with a cylindrical opening 8 for the passage of the axle 9. As shown in Fig. 6, the outer sides of the boxes may also have a cylindrical opening for the passage of the axle; but where the boxes are used at the ends of a shaft or axle, as in Fig. 2, I prefer to use a box closed on its outer side, as shown in Fig. 3. These boxes are preferably of the same or less width than the width of the part of the carriage or trolley carrying same, so as not to project to any extent beyond said parts, and each is constructed at its closed or inner end with an enlarged or thickened upper wall 10, which latter is curved to fit the upper side of the axle and forms the wearing-surface against which the axle turns, this thickened surface performing the function of the removable brasses shown in said patent.

Each box projects some distance below the axle to form a receptacle for the lubricant and projects forwardly or outwardly, terminating in an open end 11, which latter is closed by a lid or slide 12. The bottom of this receptacle is curved and deepest under the axle, so that the lubricant will gravitate to that point as it is used up. This lubricant receptacle or box is located with its long diameter or length at right angles to the axle, so that the outer side of the box may be practically flush with the outer end of the axle, thus bringing the open end of the receptacle into a position where the door 12 thereof may be easily and conveniently reached. The inner end of the box, or the end opposite the open end, is closed except for the axle-openings, and its top is semicylindrical in shape to fit within corresponding recesses in the end carriages or other parts of the crane and is provided on its inner side with an upwardly-projecting flange 13, having an opening 14 therein for the reception of the smooth end of the securing-bolt 15. These bolts 15 are each provided with a threaded section for engaging threads in the end carriage or other frame and with a smooth end which projects beyond the inner face of said carriage or frame and enters the hole 14 in flange 13. Hence by withdrawing the bolt slightly the latter will be disengaged from the flange 13.

In assembling the parts the boxes may be first placed on the axle or shaft and the end carriages or other parts lowered onto the boxes, after which the latter can be secured by the bolts 15. These flanges bearing against the inner faces of the carriages or frames prevent the boxes from sliding or creeping outwardly, while the track-wheels 6 and gearing on the axle between the boxes prevent the boxes from creeping toward each other. The boxes may also be applied to the shafts or axles carrying two wheels, the latter being located at the ends of the axle and outside the frames or carriages, and in such cases the flange might be placed between the wheels and outer face of the carriage or frame, and thus prevent any creeping of the box lengthwise the axle.

In Fig. 3 I have shown the boxes closed, so as to cover the end of the axle or shaft, and in Fig. 6 have shown them open for the passage of the shaft or axle. Where the box is open on one side only, I prefer to provide the open side with a curved flange 16, located below the opening, to catch any oil that may escape through the shaft or axle opening, and with perforations 17, through which the oil may flow back into the box, as shown in Fig. 3, and when the box is open on both sides I provide two flanges and sets of perforations, as shown in Fig. 6.

It is evident that many slight changes might be made in the relative arrangements of parts shown and described without departing from the spirit and scope of my invention. Hence I would have it understood that I do not wish to confine myself to the exact construction and arrangement of parts herein shown and described; but, Having fully described my invention, what I claim as new, and desire to secure by Letters Patent, is—

1. An oil-box having a circular opening for a shaft or axle, an integral bearing for said shaft or axle, an upwardly-projecting securing-flange located at one side of said box, and an oil-reservoir below the circular opening and extending in a direction at right angles to the long axis of the bearing.

2. An oil-box closed at one end and open at the other, and provided near its closed end with a circular opening for a shaft or axle and with an integral bearing for said shaft or axle the long axis of said bearing being at right angles to the long axis of the box.

3. The combination with a frame having a curved recess therein, of an axle-box having a curved top to fit within said recess, a flange to engage the side of the frame, means for locking the flange to the frame, and an oil-reservoir, the long diameter of the latter being parallel to the flange.

4. An oil-box comprising a frame having a curved bearing for the axle, an opening for the axle below the bearing, a flange below said opening and oil-openings passing through the side of the box above the flange.

In testimony whereof I have signed this specification in the presence of two subscribing witnesses.

CLARENCE L. TAYLOR.

Witnesses:
 DAVID FORDING,
 LEE FORDING.